Oct. 27, 1931.  E. G. GRIFFITH  1,829,087
CONVEYER CONTROL
Filed April 15, 1930  3 Sheets-Sheet 1
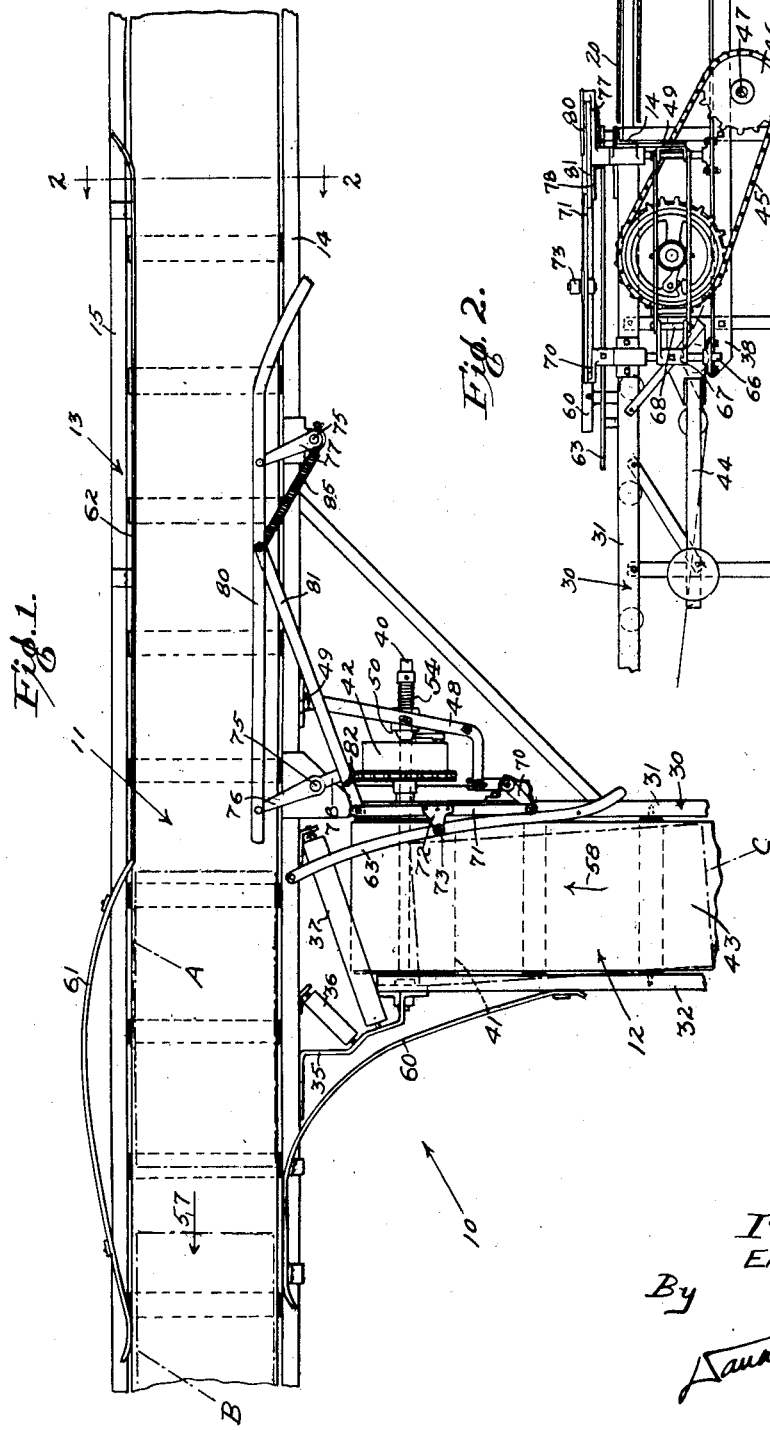
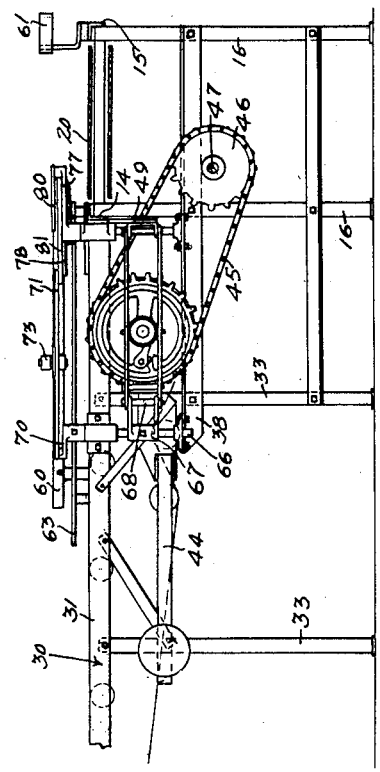
Inventor:
EARL G. GRIFFITH
By
Attorney

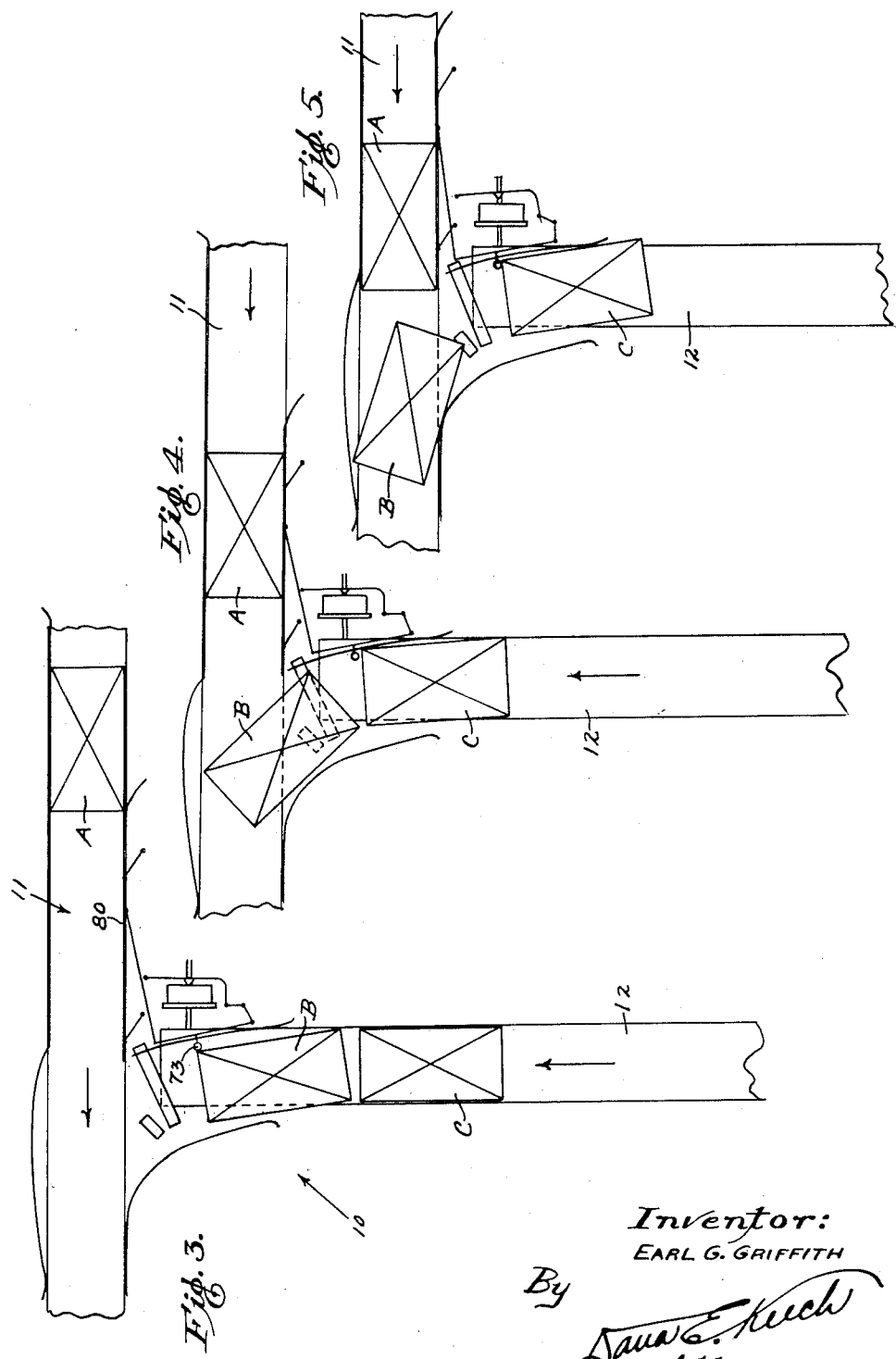

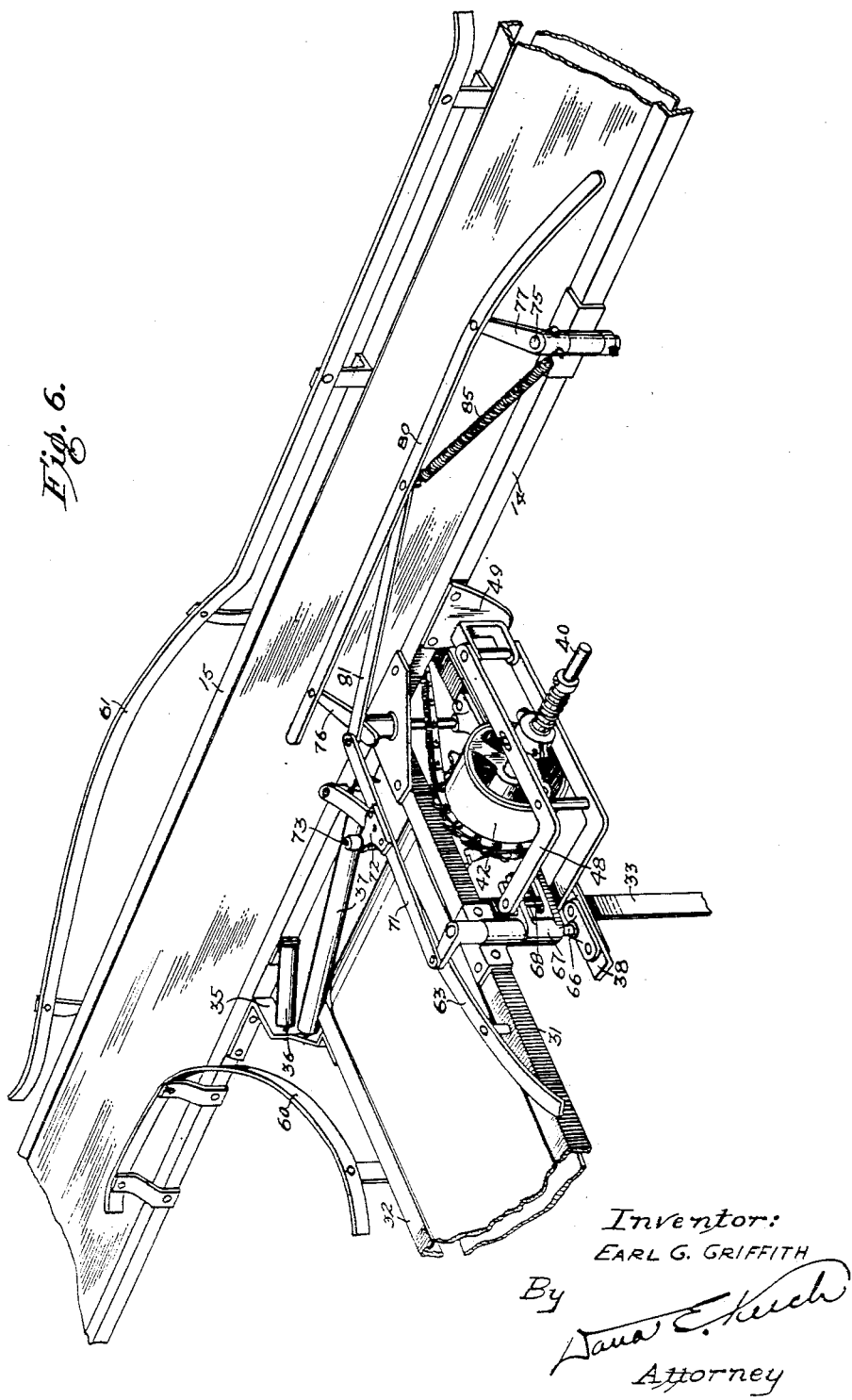

Patented Oct. 27, 1931

1,829,087

UNITED STATES PATENT OFFICE

EARL G. GRIFFITH, OF GLENDALE, CALIFORNIA

CONVEYER CONTROL

Application filed April 15, 1930. Serial No. 444,408.

My invention relates to conveyer controls and particularly to such controls as are automatically operated by articles carried on the conveyer.

While my invention is adaptable to many different situations involving conveyers, the embodiment of it disclosed herein comprises an automatic conveyer intersection switch.

My invention is an improvement upon that disclosed in the copending application of Dana E. Keech, Ser. No. 424,086, filed January 28, 1930.

In said copending application an intersection switch is illustrated which includes a main belt, a feeder belt, and means for arresting movement of the feeder belt when a box on the feeder belt arrives at the intersection and another box is also approaching the intersection on the main belt so closely that it would collide with the first box if the latter were fed from the feeder belt onto the main belt before the second box had passed through the intersection.

The mechanism for arresting the feeder belt is adapted to be actuated by a box on the feeder belt at such times as this mechanism is properly positioned by a box on the main belt. The parts connecting the box contacting elements in this mechanism are disposed under the frame structure of the intersection.

It is an object of my invention to provide a more simplified construction than that disclosed in said copending application and particularly one in which the box contacting elements are disposed close to each other and are directly connected by simple linkage.

The manner in which the foregoing object is obtained, as well as further objects and advantages, will be made manifest in the following specification and accompanying drawings in which:

Fig. 1 is a plan view of a preferred embodiment of the automatic conveyer intersection switch of my invention.

Fig. 2 is a vertical sectional view taken on the line 2—2 of Fig. 1.

Figs. 3, 4 and 5 are diagrammatic plan views illustrating the operation of the invention.

Figure 6 is a perspective view of the intersection switch of my invention.

Referring specifically to the drawings, the illustrated embodiment of the invention is indicated generally by the numeral 10 and includes a primary conveyer 11 and a secondary conveyer 12. The primary conveyer 11 has a frame 13 which includes upper longitudinal members 14 and 15 and legs 16. Supported in the usual manner by the longitudinal members 14 and 15 is a conveyer belt 20. The belt 20 is continuously driven by any suitable power means (not shown).

The secondary conveyer 12 includes a frame 30 having upper longitudinal members 31 and 32 which are supported on legs 33. The member 31 connects directly to the frame member 14 while the member 32 is provided with a bracket 35 which connects to the primary conveyer frame member 14. Loosely journalled upon the bracket 35 and suitable brackets secured to the frame member 14 are horizontal rollers 36 and 37. Connecting an adjacent pair of legs 16 which are in line with the frame member 31, and one of the legs 33 is a horizontal frame member 38.

Journalled in suitable bearings attached to the horizontal members 31 and 32 is a shaft 40 carrying a pulley drum 41 and a sprocket clutch 42. Disposed about the drum 41 and driven thereby is a secondary belt 43 which is disposed as shown and supported in the usual manner upon the frame members 31 and 32. The lower return flight of the belt 43 is tightened by a belt tightener 44.

The clutch 42 is driven by a chain 45 extending around the clutch and a sprocket 46 provided upon a power shaft 47 suitably journalled on the frame 13. The clutch 42 is controlled by a double arm 48 which is pivoted at one end upon a bracket 49, depending from the frame member 14, and which straddles a clutch cone 50 of the clutch 42 and engages pins on this cone for controlling the clutch 42. A spring 54 on the shaft 40 urges the cone 50 towards the clutch 42 so as to throw in the clutch.

The primary conveyer belt 20 moves continuously in the direction of arrow 57 and, when the clutch 42 is in, the belt 43 travels in the direction of arrow 58. Boxes or other articles discharged from the secondary conveyer 12 roll upon the rollers 36 and 37 and turn to the left onto the primary conveyer 11.

Mounted on the conveyer frames in the left hand angle formed therebetween is a guide bar 60. Supported on the frame 13 on the opposite side of the primary conveyer 11 from the guide bar 60 and on the same level therewith, is a curved guide bar 61. Continuing from the right hand end of the guide bar 61 alongside the primary conveyer 11 is a straight guide bar 62. Extending over the opposite side of the discharge end of the primary conveyer 12 from the guide bar 60 is a curved guide bar 63. The purpose of the guide bar 63 is to slightly change the direction of movement of an article entering the intersection on the secondary conveyer 12.

Rotatably mounted in bearings secured upon the frame members 31 and 38 is a vertical shaft 66 having a double arm 67 fixed thereto, each arm of which is bifurcated so as to receive a vertical roller 68 provided upon the free end of the double clutch actuating arm 48 whereby rotation of the shaft 66 throws out the clutch 42 or permits the spring 54 to throw the clutch in. Secured upon the upper end of the shaft 66 is a short arm 70 which extends towards the secondary conveyer 12 and preferably is inclined in the direction from which articles are carried on said conveyer. Pivotally connected to the end of the arm 70 is a link 71 having a bracket 72 provided thereon which extends towards the secondary conveyer 12 there being a box contacting roller 73 provided on the extremity of the bracket 72.

Pivotally supported in vertical positions in suitable brackets provided on the primary conveyer frame member 14 are shafts 75 upon which are provided arms 76 and 77, the arm 76 having a rearward extension 78 as shown. Pivotally supported upon ends of the arms 76 and 77 is a box contacting bar 80. With one end pivotally secured to the bar 80 and the other end pivotally secured to the link 71, is a link 81 which rests upon the extension 78 of the arm 76 and has a stop bolt 82 provided therein which limits sliding movement of the link 81 in a given direction over said extension. Extending between the bar 80 and the hub of the arm 77 is a tension spring 85 which yieldably holds the bar 80 and associated parts in the positions in which they are shown in Fig. 1, in which the stop 82 rests against the arm extension 78.

The operation of my invention is as follows:

For the purpose of illustration, the switch illustrated was designed to operate when carrying packed boxes of oranges, and three boxes, A, B and C are indicated in Figs. 3, 4, 5 and 1, successive positions of these boxes in the normal operation of the switch 10 being shown in these figures in the order named. The space between the guide 62 and the bar 80, with the latter positioned as shown in Fig. 1, is insufficient for a box, traveling on the primary conveyer 11, to pass therebetween.

As before stated, the purpose of this switch mechanism is to prevent interference of boxes discharged onto the primary conveyer 11 from the secondary conveyer 12 with those already traveling on the primary conveyer. This control is accomplished by boxes on both the primary conveyer 11 and the secondary conveyer 12. For instance, a box approaching the switch on the primary conveyer contacts the bar 80 and swings this outwardly against the tension of the spring 85 so as to make room for the passage of the box thereby.

Acting through the link 81, this forces the roller 73 out over the belt 43 of the secondary conveyer 12 and into the path of any approaching box carried on this belt. If the front end of a box carried on the conveyer 12 has already moved past the roller 73, as shown in Fig. 3, this movement of the roller 73 will merely shift the front end of this box a slight distance laterally on the belt 43 and slightly increase the turning effect which normally would be given this box by the guide bar 63.

In Fig. 3, box A has just contacted the bar 80 so as to extend the roller 73 out over the conveyer 12, box B is being carried on the conveyor 12, and its front end has just previously to this been extended beyond the roller 73 so that this box is shifted laterally a slight distance across the conveyer 12, as just described. Box C is traveling on the conveyer 12 immediately following box B.

In Fig. 4, box A has traveled on the conveyer 11 about half the length of the bar 80; box B is making the turn at the intersection and is about half disposed on the conveyer 11; and box C is approaching contact with the roller 73.

In Fig. 5, box A has arrived at the intersection; box B is just completing the turn at the intersection in advance of box A; and box C has contacted the roller 73 so as to carry the link 71 forwardly with it, thereby rotating the shaft 66 and swinging the double clutch arm 48 outwardly so as to throw out the clutch 42 and arrest movement of the secondary conveyer 12.

Obviously the secondary conveyer remains still until box A has passed out of contact with the bar 80, as shown in Fig. 1, whereupon the spring 85 returns the bar 80 to the position in which it is shown in this figure. This pulls the roller 73 away from in front of box C so that the spring 54 is free to swing the double clutch lever 48 inwardly and throw in the clutch 42, this resulting in the links 71 and 81 and the arms 67 and 70 being returned to the position in which they are shown in Fig. 1. After box A has moved out of contact with the bar 80 the sequence of movements of the control apparatus required to actually recommence movement of the secondary conveyer 12 takes up sufficient time to perceptibly retard the advancing of box C so as to allow box A to be far enough advanced when box C enters the intersection, so that there is no possibility of interference between these two boxes.

As before mentioned, the principal object of my invention is the economy of construction obtained by placing the bar 80 and the link 71 opposite adjacent edge portions of the intersecting conveyors 11 and 12 and connecting these directly by a link 81.

Another economy is introduced by positively urging the roller 73 into the path of articles carried on the secondary conveyer 12, which eliminates the necessity for yieldable mechanism employed in the device previously disclosed in the copending application referred to above.

While I have shown but a single embodiment of my invention, it is to be understood that various modifications might be made therein without departing from the spirit of the invention or the scope of the appended claims.

What I claim is:

1. In combination: a primary conveyer; a secondary conveyer disposed to feed articles onto said primary conveyer; means for arresting said secondary conveyer; means for controlling said arresting means and including an article contacting member, said article contacting member being adapted to be actuated by an article on said secondary conveyer when properly positioned in the path of said article; means for positioning said control means to permit such actuation, said positioning means being operated by an article traveling upon said primary conveyer and including an article contacting member and a link directly connecting said article contacting member.

2. A combination as in claim 1 in which said link is disposed above the level of said conveyer.

3. In combination: a primary conveyer; a secondary conveyer disposed to feed articles onto said primary conveyer; means for arresting said secondary conveyer; means for controlling said arresting means and including an article contacting member, said article contacting member being adapted to be actuated by an article on said secondary conveyer when properly positioned in the path of said article; means for positioning said control means to permit such actuation, said positioning means being operated by an article traveling upon said primary conveyer and including a shiftable member and means for connecting this to the aforesaid article contacting member so that the shifting of said shiftable member by an article on said primary belt will positively move an article laterally on said secondary belt if the side of said last-mentioned article is engaged by said article contacting member, and thereby positioning said article contacting member in the path of the next article approaching on said secondary belt.

4. A combination as in claim 3 in which said shiftable member and said article contacting member are directly connected by a link disposed substantially in a horizontal position.

5. In combination: a primary conveyer; a secondary conveyer disposed to feed articles onto said primary conveyer; means for arresting said secondary conveyer; means for controlling said arresting means and disposed alongside the discharge end of said secondary conveyer on the side thereof away from which boxes turn when discharged therefrom, said control means being adapted to be positioned over said secondary conveyer so that it will be engaged by an article on said secondary conveyer and moved to actuate said arresting means; and means operated by an article on said primary conveyer for positioning said control means for such actuation.

6. A combination as in claim 5 in which said control means comprises a substantially horizontally disposed link which is pivoted vertically at one end thereof and which carries a box contacting element and is adapted to be swung about said vertical pivot by a link pivotally connecting its free end to the primary conveyer article operated means.

7. A combination as in claim 5 in which said primary conveyer article operated means is disposed on the same side of the primary conveyer as the secondary conveyer and adjacent said control means.

8. In combination: a conveyer; power transmission means for driving said conveyer; means for disconnecting said driving means; a member for actuating said disconnecting means when contacted by a forwardly disposed article on said conveyer and moved by said article; and means for positively moving said member into the path normally traversed by articles on said conveyer whereby an article opposite said member is bodily shifted out of said path and said member is positioned for contact by the succeeding article so as to actuate said disconnecting means.

In testimony whereof, I have hereunto set my hand at Los Angeles, California, this 19th day of March, 1930.

EARL G. GRIFFITH.